United States Patent
Butlin, Jr. et al.

(10) Patent No.: US 8,201,869 B1
(45) Date of Patent: Jun. 19, 2012

(54) MULTI-HINGED TAILGATE ASSEMBLY

(75) Inventors: Albert H. Butlin, Jr., Beverly Hills, MI (US); James G. Gobart, Rochester, MI (US)

(73) Assignee: GM Global Tehnology Operations LLC, Detroit, MI (US)

( * ) Notice: Subject to any disclaimer, the term of this patent is extended or adjusted under 35 U.S.C. 154(b) by 0 days.

(21) Appl. No.: 13/091,253

(22) Filed: Apr. 21, 2011

(51) Int. Cl.
  *B62D 25/00* (2006.01)
(52) U.S. Cl. .......................... 296/57.1; 296/62
(58) Field of Classification Search .......... 296/57.1, 296/62
  See application file for complete search history.

(56) References Cited

U.S. PATENT DOCUMENTS

| | | | |
|---|---|---|---|
| 688,448 A * | 12/1901 | Thompson | 296/62 |
| 5,788,311 A * | 8/1998 | Tibbals | 296/62 |
| 6,764,123 B1 * | 7/2004 | Bilyard | 296/61 |
| 6,905,157 B2 * | 6/2005 | Kang et al. | 296/55 |
| 7,111,885 B1 * | 9/2006 | Hoffmann et al. | 296/26.11 |

* cited by examiner

*Primary Examiner* — Joseph Pape
(74) *Attorney, Agent, or Firm* — Quinn Law Group, PLLC

(57) ABSTRACT

A tailgate assembly for connection to a vehicle body includes a first panel portion configured for hinged connection to the vehicle body, as well as a second panel portion hinged to the first panel portion. The second panel portion is configured to be pivoted from a first position in which the second panel portion is generally parallel with the first panel portion to a second position in which the second panel portion is generally perpendicular to the first panel portion to reduce a first height of the tailgate. In some embodiments, the tailgate assembly further includes a third panel portion hinged to the second panel portion and configured to be pivoted between a stowed position in which the third panel portion extends generally parallel with the second panel portion and a use position in which the third panel portion extends generally perpendicular to the second panel portion.

19 Claims, 6 Drawing Sheets

MULTI-HINGED TAILGATE ASSEMBLY

TECHNICAL FIELD

The invention relates to a tailgate assembly for a vehicle.

BACKGROUND

On occasion, a vehicle owner may desire additional cargo space, such as for transporting luggage, furniture, camping gear, or picnic items. Pickup trucks offer a relatively large amount of cargo space, most of which is in a truck bed. Typically, the truck bed is accessed by opening a pivotable tailgate at the rear of the truck bed.

SUMMARY

A tailgate assembly for connection to a vehicle body has multiple reconfigurable panel portions. A first panel portion is configured for hinged connection to the vehicle body. A second panel portion is hinged to the first panel portion. The second panel portion is configured to be pivoted from a first position in which the second panel portion is generally parallel with the first panel portion to a second position in which the second panel portion is generally perpendicular to the first panel portion to reduce a first height of the tailgate.

In some embodiments, the tailgate assembly further includes a third panel portion hinged to the second panel portion and configured to be pivoted between a stowed position in which the third panel portion extends generally parallel with the second panel portion and a use position in which the third panel portion extends generally perpendicular to the second panel portion. This embodiment may be referred to as a tri-fold tailgate assembly. The tailgate assembly is substantially the first height when the first panel portion is in either of the open position and the closed position, the second panel portion is in the first position, and the third panel portion is in either of the stowed position and the use position. In some embodiments, the first panel portion forms a recess, which may be generally U-shaped, with the second panel portion attached to the first panel portion in the recess.

When connected to the vehicle body, the tailgate assembly allows easier access to the cargo area by reducing the overall height of the tailgate assembly when the second portion is pivoted to the second position. The tailgate assembly can be configured to provide two-tier loading for accommodating cargo of different lengths. Furthermore, the tailgate assembly can be configured so that the third portion functions as a step for entry to the cargo area. The third portion can also be positioned to potentially reduce aerodynamic drag.

The above features and advantages and other features and advantages of the present invention are readily apparent from the following detailed description of the best modes for carrying out the invention when taken in connection with the accompanying drawings.

DETAILED DESCRIPTION

Figure 1:
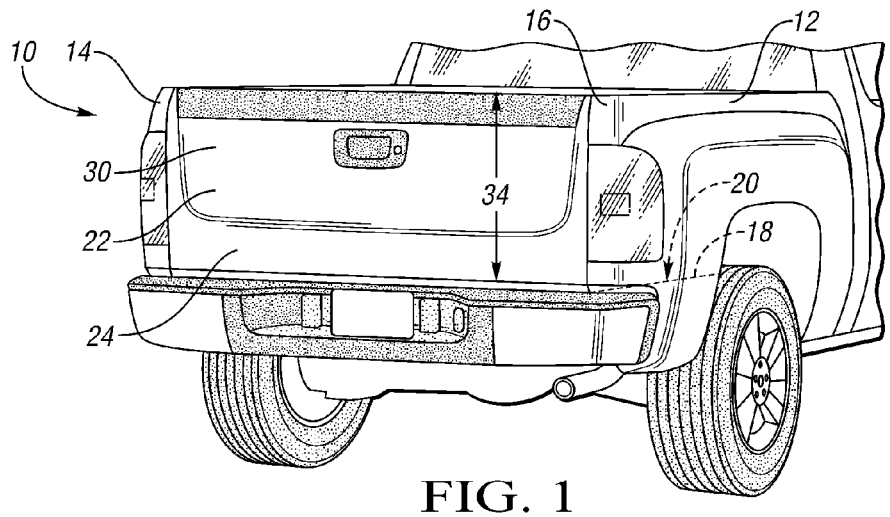
FIG. 1 is a schematic perspective illustration in fragmentary view of a vehicle with a tailgate assembly.

Referring to the drawings, wherein like reference numbers refer to like components throughout the several views, FIG. 1 shows a portion of a vehicle 10. The vehicle 10 has a vehicle body 12 that includes a first sidewall 14, a second sidewall 16, and a floor 18 (shown only in phantom and extending between the sidewalls 14, 16 to provide a first loading surface 20 for cargo). The floor 18 and first loading surface 20 are best shown in FIG. 7.

Figure 7:
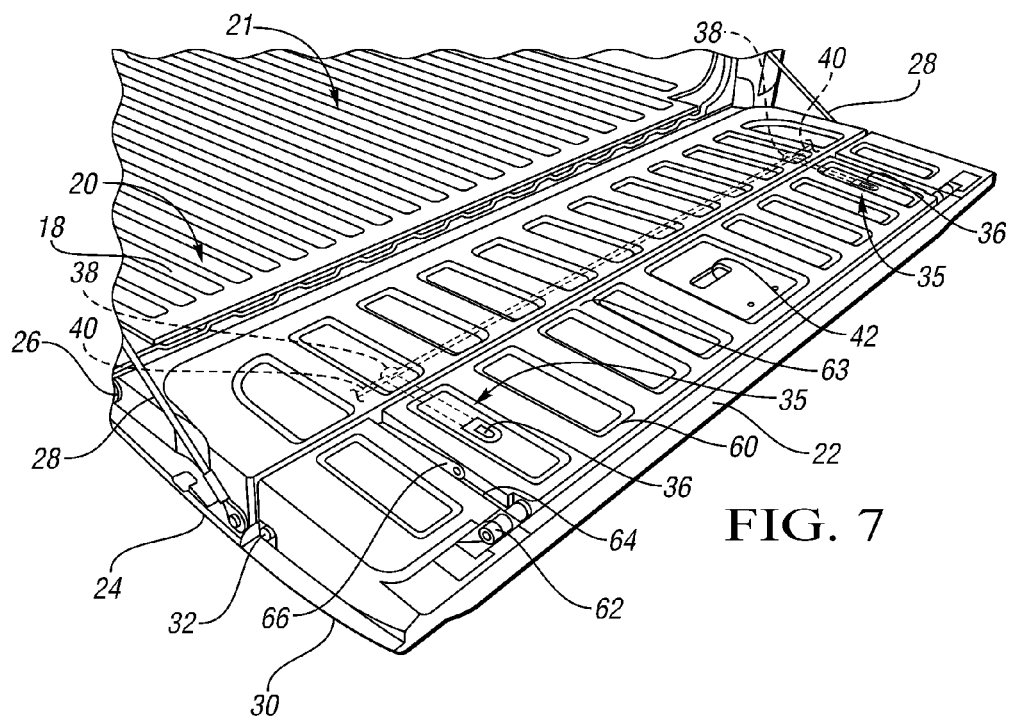
FIG. 7 is a schematic perspective fragmentary illustration of the portion of the vehicle with the tailgate assembly in an open position, showing release levers and latches.

The vehicle 10 includes a tailgate assembly 22 shown in a closed position in FIG. 1 and an open position in FIG. 7. The vehicle 10 is a pickup configuration, but the claimed invention is not limited to a pickup-type vehicle. The tailgate assembly 22, sidewalls 14, 16 and floor 18 partially define a cargo space 21, best shown in FIGS. 5 and 7, for storing cargo. As further described below, the tailgate assembly 22 has multiple hinges allowing different portions of the tailgate assembly 22 to be positioned in various configurations to ease access to the cargo space 21, to provide a step for accessing the cargo space 21, to provide an additional loading surface enabling two-tier loading of cargo, and to potentially reduce aerodynamic drag.

Figure 3:
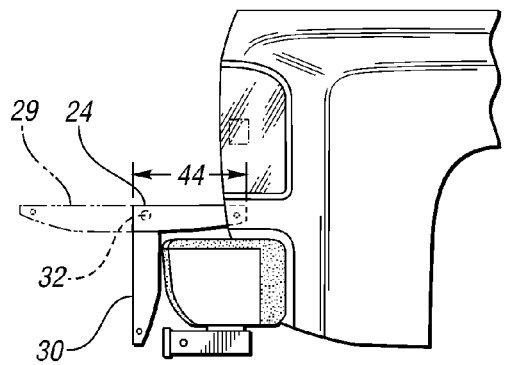
FIG. 3 is a schematic illustration in fragmentary side view of the vehicle of FIG. 1 with a first portion of the tailgate assembly in an open position, a second portion of the tailgate assembly in a second position, and a third portion of the tailgate assembly in a stowed position, the tailgate assembly having a reduced height for easy access to the cargo space.
Figure 4:
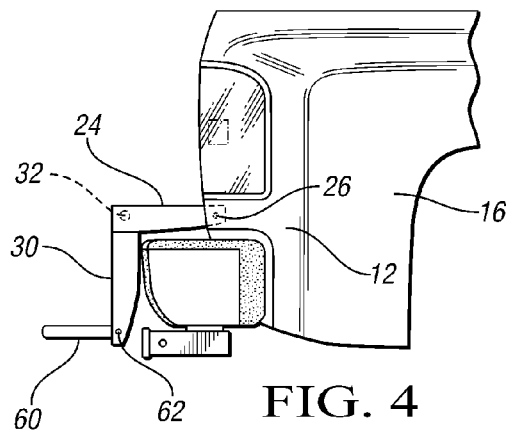
FIG. 4 is a schematic illustration in fragmentary side view of the vehicle of FIG. 1 with a first portion of the tailgate assembly in an open position, a second portion of the tailgate assembly in a second position, and a third portion of the tailgate assembly in a use position, the tailgate assembly providing a step configuration for easy access to the cargo space.
Figure 8:
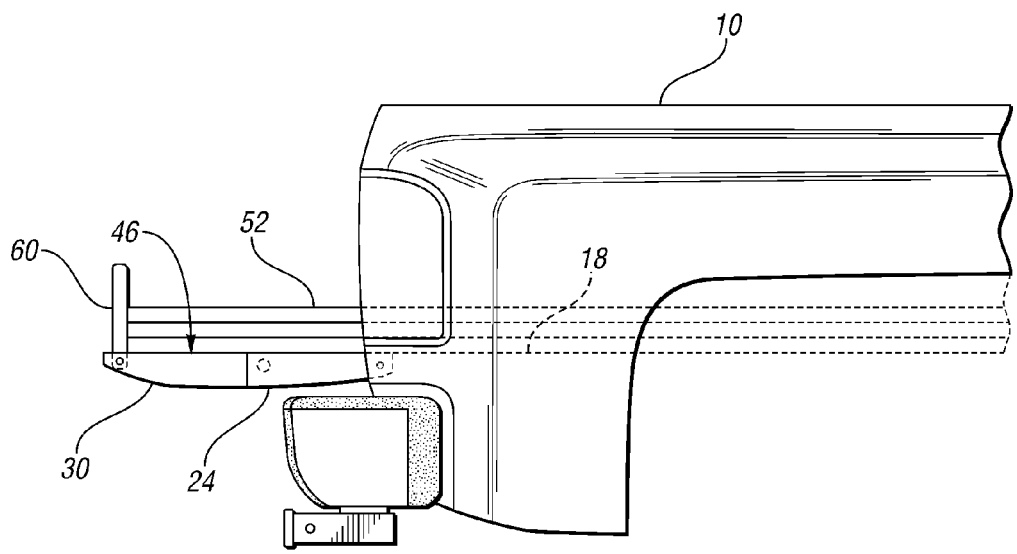
FIG. 8 is a schematic illustration in fragmentary side view of the vehicle of FIG. 1 with a first portion of the tailgate assembly in an open position, a second portion of the tailgate assembly in a first position, and a third portion of the tailgate assembly in a use position, the tailgate assembly configured to extend the first loading surface and provide an end wall to retain cargo.

FIGS. 4 and 8 show that the tailgate assembly 22 has three portions hinged to one another to allow the various configurations described herein. A first portion 24 is hinged to the vehicle body 12 at a first hinge 26. The first portion 24 is also referred to as a first panel portion. The first hinge 26 may be a conventional hinge used to pivotably connect the tailgate assembly 22 to the vehicle body 12. The first hinge 26 permits the first portion 24 to move between the closed position of FIG. 1 and the open position of FIGS. 2-4 and 7-8. In the closed position, the first portion 24 is generally perpendicular to the floor 18. In the open position, the first portion 24 is generally parallel to and flush with the first loading surface 20 of the floor 18 and thereby extends the first loading surface 20. Flexible connector cables 28, shown only in FIG. 7, connect either side of the first portion 24 to the vehicle body 12 to help support the tailgate assembly 22 when the first portion 24 is in the open position shown in FIG. 7. Latch assemblies (not shown) may be used to connect the lateral sides of the first portion 24 to the respective sidewalls 14, 16 so that the first portion 24 is secured in the closed position. These latch assemblies may be any known type of latch assembly, such as latch assemblies used to connect a tailgate to sidewalls.

Figure 2:
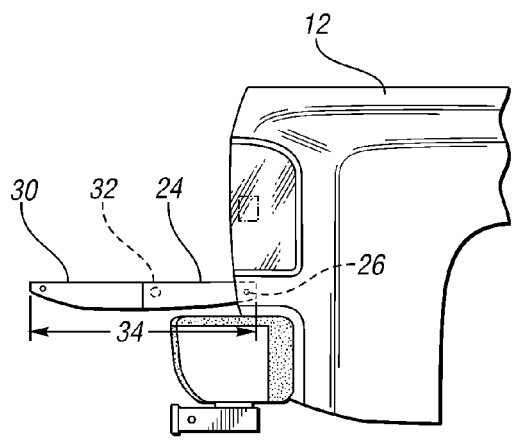
FIG. 2 is a schematic illustration in fragmentary side view of the vehicle of FIG. 1 with the tailgate assembly in an open position.

The tailgate assembly 22 also includes a second portion 30 hinged to the first portion 24 at a second hinge 32. The second portion 30 is also referred to as a second panel portion. The second portion 30 is shown in FIG. 2 in a first position in which it is generally parallel with the first portion 24. When the second portion 30 is in the first position, the tailgate assembly 22 has a first height 34 whether the first portion 24 is in the closed position of FIG. 1 or the open position of FIG. 2. The first height 34 is defined as the distance from a lower edge of the first portion 24 (i.e., the edge nearest the floor 18) to an edge of the second portion 30 furthest from the floor 18. Latch assemblies (not shown) may be used to connect the lateral sides of the second portion 30 to the respective sidewalls 14, 16 so that the second portion 30 is secured in the first position. These latch assemblies may be any known type of latch assembly, such as latch assemblies used to connect a tailgate to sidewalls.

Referring to FIG. 7, an end of the second hinge 32 is visible near the center of the side of the tailgate assembly 22. Latch assemblies 35 maintain the second portion 30 in the first position with respect to the first portion 24. Each latch assembly 35 includes a release lever 36 connected with a latch 38 that engages a striker 40. In the embodiment shown, the tailgate assembly 22 is shown with two latch assemblies 35. In other embodiments, one latch assembly 35 or more than two latch assemblies 35 may be used. Any known latch mechanism to latch the second portion 30 in the first position with respect to the first portion 24 may be used. To pivot the second portion 30 to the second position of FIG. 3, an operator pulls the outboard facing ends of the release levers 36 upward and rearward. This causes the latches 38 to disengage from the strikers 40, allowing the second portion 30 to freely pivot with respect to the first portion 24. The latch assemblies 35 may be released one at a time or simultaneously.

When the second portion 30 is in the second position, as shown in FIG. 3, the second portion 30 is generally perpendicular to the first portion 24, and the height of the tailgate assembly 22 is reduced to a second height 44. The second height 44 allows easier access to the cargo space 21, as a person can stand closer to the cargo space 21 and therefore can reach further into the cargo space 21 than when the second portion 30 is in the first position 29 (shown in phantom) of FIG. 3, in which the tailgate assembly 22 has the first height 34 of FIG. 2.

Figure 5:
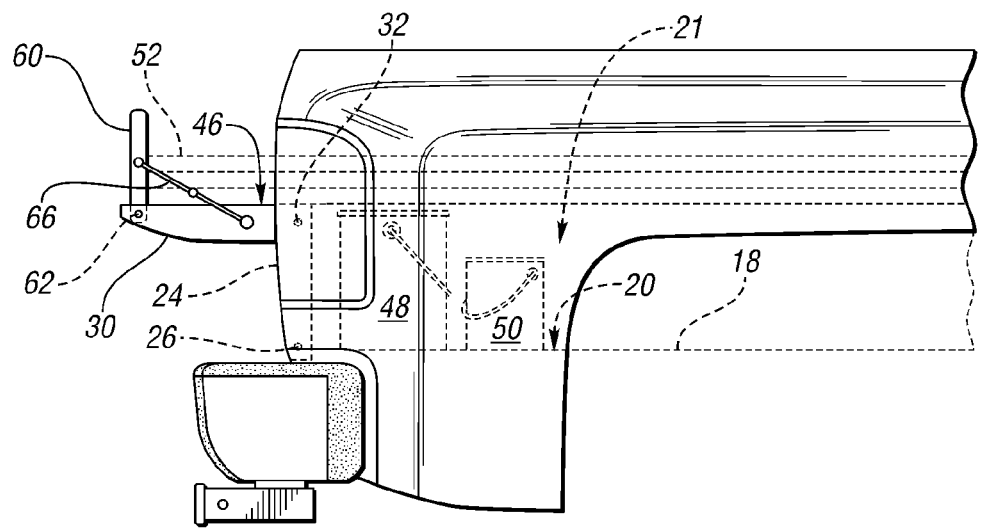
FIG. 5 is a schematic illustration in fragmentary side view of the vehicle of FIG. 1 with a first portion of the tailgate assembly in a closed position, a second portion of the tailgate assembly in a second position, and a third portion of the tailgate assembly in a use position, the second portion providing a second loading surface for two-tier loading of the cargo space.

Referring to FIG. 5, when the first portion 24 is in the closed position and the second portion 30 is in the second position, the second portion 30 provides a second loading surface 46 that is generally parallel with and spaced above the first loading surface 20 of the floor 18. In this configuration, the tailgate assembly 22 allows two-tier loading of cargo. Smaller cargo items 48, 50 are placed on the first loading surface 20 while longer cargo items 52 are supported by the second portion 30 on the second loading surface 46. The longer cargo items 52 extend in the cargo space 21 above the smaller cargo items 48, 50. The cargo space 21 is extended rearward by the second loading surface 46 provided by the second portion 30.

Referring to FIG. 7, the tailgate assembly 22 also has a third portion 60 hinged to the second portion 30 at a third hinge 62. The third portion 60 is also referred to as a third panel portion. In FIG. 7, the third portion 60 is in a stowed position in which it is substantially nested within a recess 64 of the second portion 30 so that the third portion 60 is substantially parallel with the second portion 30. Because the third hinge 62 connects the third portion 60 to the second portion 30 near an end of the tailgate assembly 22 opposite the end at which the first portion 24 is connected to the vehicle 10, with a free or unhinged end 63 of the third portion 60 extending toward the second hinge 32, the third portion 60 pivots from the stowed position to the use position in the same direction of rotation that the second portion 30 pivots from the first position to the second position. A recess in the second portion 30 forms a handle 42 allowing the operator to pivot the third portion 60 at the hinge 62 to a use position shown in FIGS. 4, 5, 6 and 8. Folding support arms 66 on either side of the third portion 60 (one shown in FIG. 7) connect the third portion 60 to the second portion 30 to prevent pivoting of the third portion 60 beyond the use position, as shown in FIG. 5.

Referring now to FIG. 4, with the first portion 24 in the open position and the second portion 30 in the second position, the third portion 60 of the tailgate assembly 22 may be pivoted from a stowed position of FIG. 7 to a use position to function as a step for access to the cargo space 18.

Figure 9:
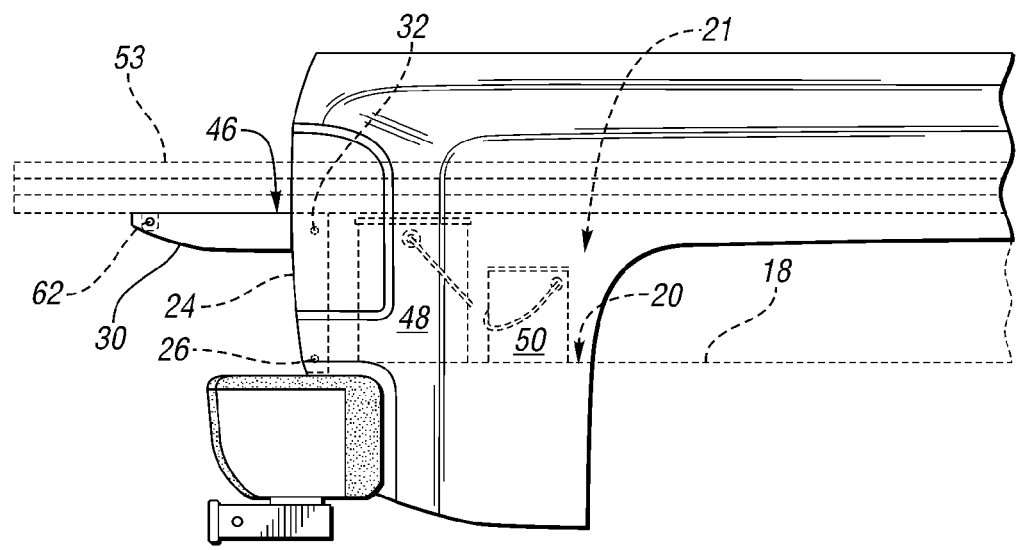
FIG. 9 is a schematic illustration in fragmentary side view of the vehicle of FIG. 1 with a first portion of the tailgate assembly in a closed position, a second portion of the tailgate assembly in a second position, and a third portion of the tailgate assembly in a stowed position, the second portion providing a second loading surface for two-tier loading of the cargo space especially for extra-long cargo.
Figure 10:
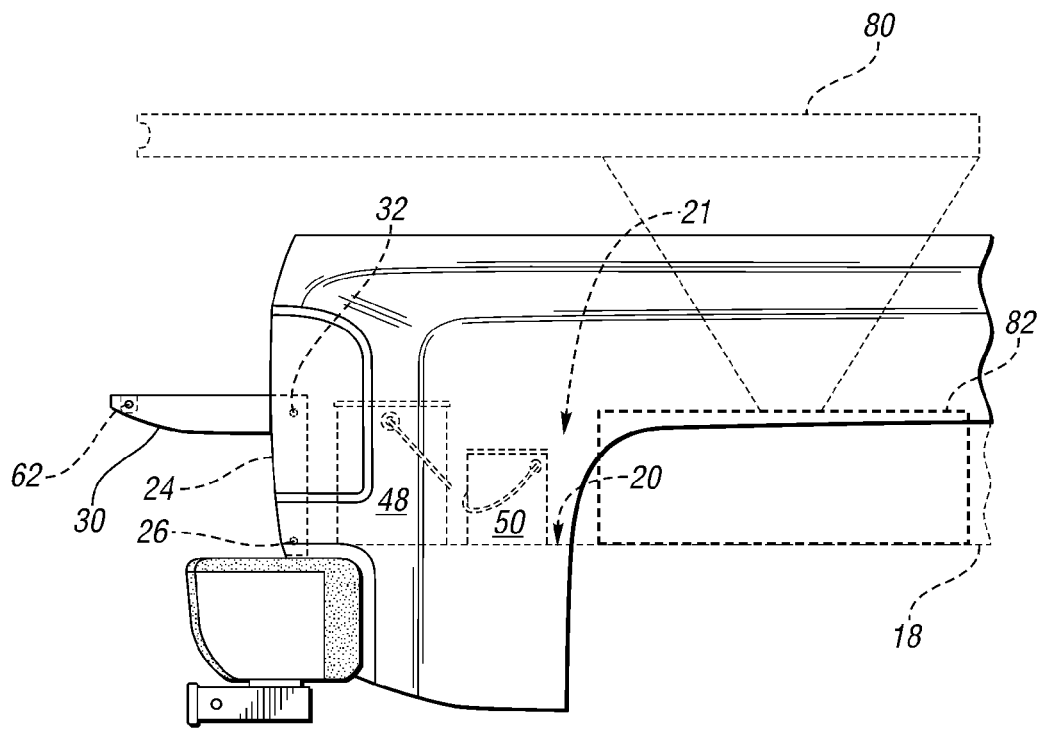
FIG. 10 is a schematic illustration in fragmentary side view of the vehicle with the tailgate assembly as shown in FIG. 9, with a fifth wheel trailer secured to the vehicle.

As shown in FIG. 5, when the first portion 24 is in the closed position and the second portion 30 is in the second position, the third portion 60 may be pivoted to the use position to provide a terminal end wall for cargo. Alternately, as shown in FIG. 9, the third portion 60 (not visible) may remain in the stowed position, allowing extra-long cargo 53 to be supported on the second loading surface 46 and extend beyond the second portion 30. In FIG. 10, with the first portion 24 in the closed position, the second portion 30 in the second position, and the third portion 60 (not visible) in the stowed position, the tailgate assembly 22 is well suited to enable a fifth wheeler to be mounted to a pivot connection near the center of the floor 18. The fifth wheeler is represented by a fifth wheeler trailer tongue 80 shown pivotably connected to a fifth wheeler receiver hitch 82 mounted to the floor 18 as is well understood by those skilled in the art. Mounting the trailer tongue 80 to the receiver hitch 82 is accomplished more easily with the second portion 30 in the second position.

Figure 6:
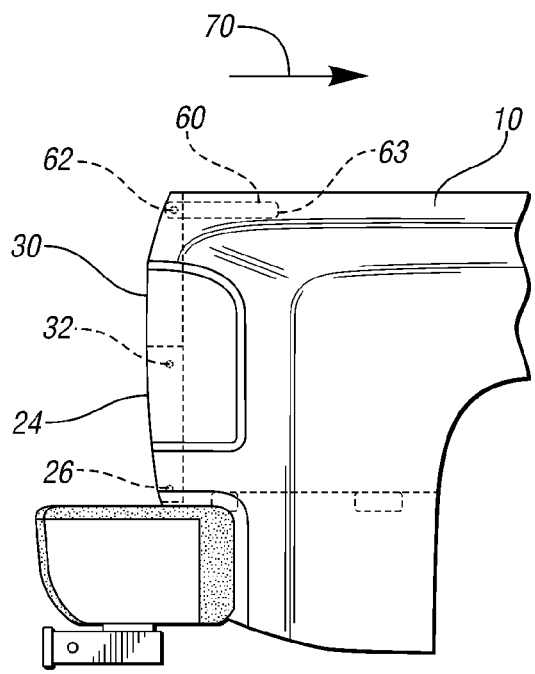
FIG. 6 is a schematic side view illustration in fragmentary side view of the vehicle of FIG. 1 with a first portion of the tailgate assembly in a closed position, a second portion of the tailgate assembly in the first position, and a third portion of the tailgate assembly in a use position, the tailgate assembly potentially reducing aerodynamic drag.

FIG. 6 shows the tailgate assembly 22 with the first portion 24 in the closed position, the second portion 30 in the first position, and the third portion 60 in the use position. In this configuration, the third portion 60 may reduce aerodynamic drag on the vehicle 10 when the vehicle moves in a forward direction indicated by arrow 70. Those skilled in the art understand that reducing airflow into the rear of a pickup may reduce air resistance of the vehicle 10.

Referring to FIG. 8, when the first portion 24 is in the open position and the second portion 30 is in the first position, the third portion 60 may be pivoted to the use position to provide a terminal end wall for cargo 52 at a rearward end of the vehicle 10.

The hinges 26, 32, 62 of the tailgate assembly 22 may extend the entire width of the respective portions 24, 30, 60, or may be segmented.

Figure 11:
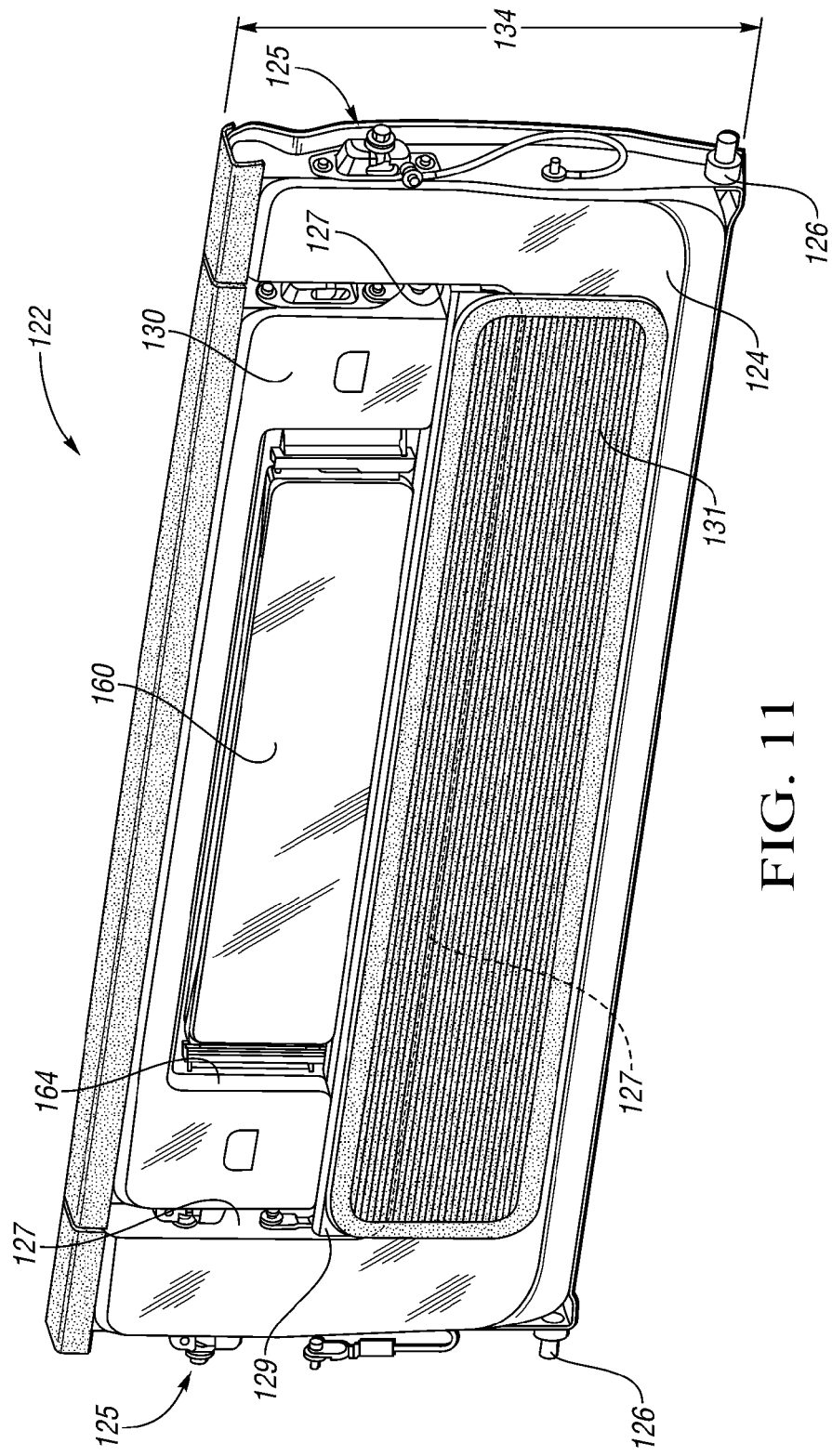
FIG. 11 is a schematic perspective illustration of another embodiment of a tailgate assembly.

FIG. 11 shows another embodiment of a tailgate assembly 122 that may be pivotably connected to the vehicle 10 of FIG. 1 in lieu of tailgate assembly 22. FIG. 11 shows the side of the tailgate assembly 122 that would face the cargo area 21 of FIG. 1 if installed on the vehicle 10 of FIG. 1. The tailgate assembly 122 includes a first panel portion 124 that may be pivotably connected to the vehicle body 12 of FIG. 1 at hinges 126. One hinge 126 is obscured in FIG. 12 and is substantially identical to the hinge 126 shown. The first panel portion 124 may be in a closed position, as in FIG. 11, and may be pivoted to an open position, as in FIG. 12. In the open position of FIG. 12, the first panel portion 124 would be generally parallel to and flush with the floor 18 of FIG. 5 to extend the first loading surface 20 of the vehicle 10. A flexible connector cable 128 at one or both sides of the first panel portion 124 connects to the vehicle body 12 of FIG. 1.

The first panel portion 124 forms a generally U-shaped recess 127 in which a second panel portion 130 is hinged to the first panel portion 124 at hinge 132. Another identical hinge 132 is at the other end of the recess and is partially obscured in FIG. 12. The U-shaped recess 127 is partially obscured by a retainer 129 and a tread 131 in FIG. 11, but is shown with hidden lines where obscured. In FIG. 11, the second panel portion 130 is in a first position in which it is generally parallel with the first panel portion 124. The tailgate assembly 122 has a first height 134 when the second panel portion 130 is in the first position. The first height 134 is defined as a distance from a lower edge of the first panel portion 124 (i.e., the edge nearest the floor 18 of the vehicle 10 of FIG. 1 when installed on the vehicle 10) to an edge of the second portion 130 that would be furthest from the floor 18.

Figure 12:
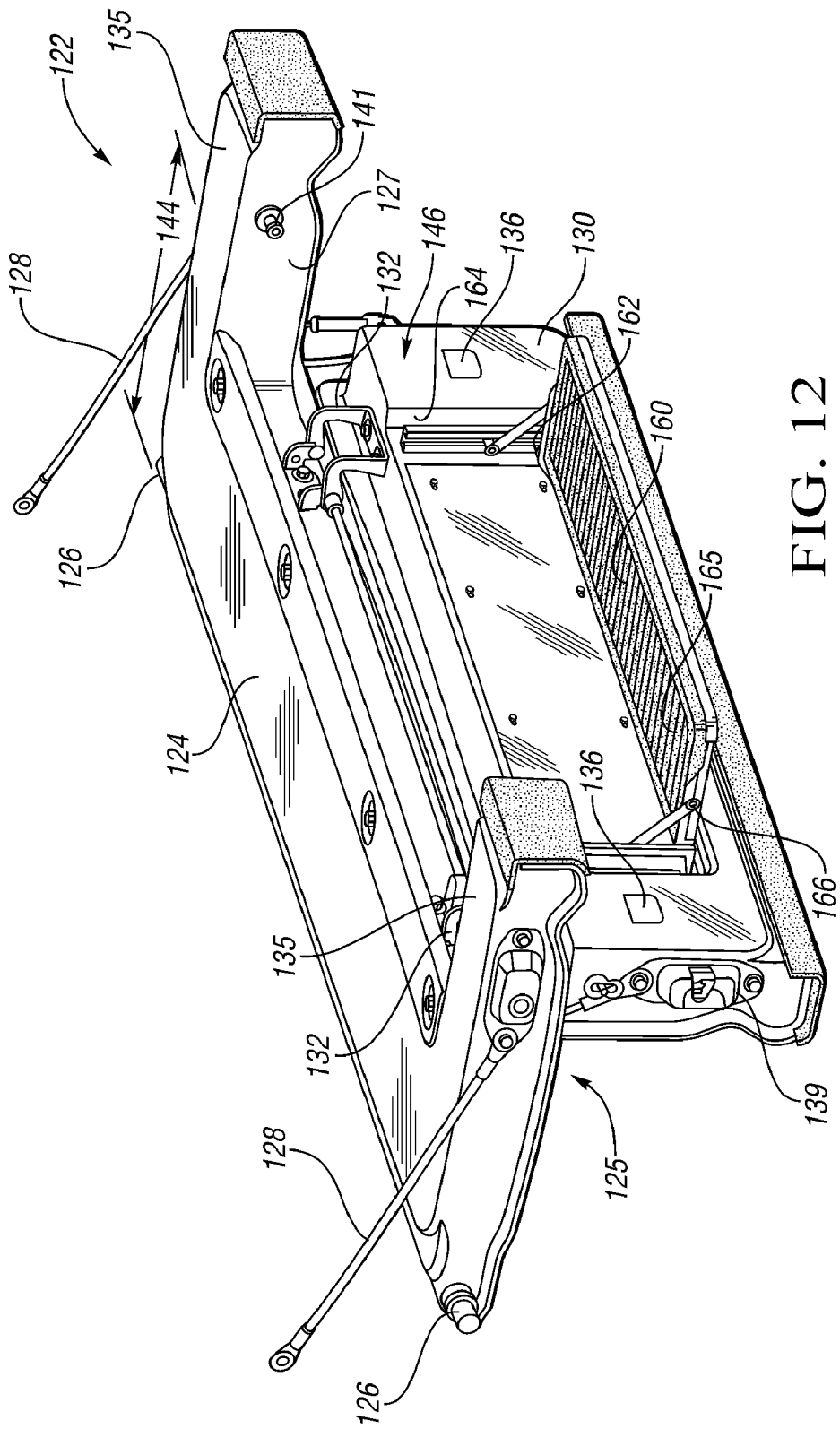
FIG. 12 is a schematic perspective illustration of the tailgate assembly of FIG. 11 with the first panel portion in an open position, the second panel portion in a second position, and the third panel portion in a use position.

The second panel portion 130 may be pivoted at the hinge 132 to a second position in which it is generally perpendicular to the first panel portion 130, as shown in FIG. 12. In FIG. 12, this allows the tailgate assembly 122 to have a second height 144 at the recess 127 that is less than the first height 134. The second height 144 is defined as the distance from the lower edge of the first portion 130 to a surface 146 of the second portion 130, as a person would be able to stand adjacent to the surface 146 (assuming the third portion is in the stowed position) to access the cargo space 21 of FIG. 5. The first panel portion 124 forms two posts 135 at lateral ends of the first portion 124 on either side of the recess 127. At the posts 135, the first panel portion 124 still has the first height 144 regardless of the position of the second panel portion 130. Because latch assemblies are conventionally located at the sides of a tailgate, latch assemblies 125 on either side of the first panel portion 124 at the posts 135 may be used that are identical to the location of latch assemblies on a vehicle with a conventional tailgate. Accordingly, the tailgate assembly 122 may be especially advantageous in that it may be easily retrofitted to a vehicle and make use of the same latch assemblies.

To pivot the second panel portion 130 to the second position, an operator pulls release levers 136 that release latch assemblies 139 mounted to sides of the second portion 130 from strikers 141 mounted to the posts 135 of the first portion 124. The latch assemblies 139 may be released simultaneously or one at a time. Only one latch assembly 139 and one striker 141 are visible in FIG. 12, but each side of the second panel portion 130 has a latch assembly 139, and each post 136 has a corresponding striker 141.

A third panel portion 160 is pivotably connected to the second panel portion 130 at a pair of hinges 162 (one shown in FIG. 12, with the other being substantially identical and laterally spaced on the second panel portion 130). The third panel portion 160 is shown in a stowed position in FIG. 11 in which it is generally parallel with the second panel portion 130 and the first panel portion 124 and is nested in a recess 164 defined by the second panel portion 130. The third panel portion 160 is hinged to the second panel portion 130 at hinge 162, and may be pivoted to a use position shown in FIG. 12 in which it is generally perpendicular to the second panel portion 130. Folding support arms 166 help support the third panel portion 160 in the use position. In the use position, with the second panel portion 130 in the second position and the first panel portion 124 in the open position, the third panel portion 160 is configured as a step for entry into the cargo space 21 of FIG. 1. The third panel portion 160 has a tread 165 used for a stepping surface as shown in FIG. 12. The first panel portion 124 also has tread 131 (removed in FIG. 12) that is used for a stepping surface.

The first panel portion 124, the second panel portion 130, and the third panel portion 160 may be positioned in various combinations of positions similar to those shown with the panel portions 24, 30 and 60 of tailgate assembly 22. For example, when the first panel portion 124 is in the closed position, the second panel portion 130 is in the second position generally parallel with the floor 18 of FIG. 2, and the third panel portion 160 is in either the stowed position or the use position, the surface 146 of the second panel portion 130 will serve as a second loading surface similar to surface 46 of tailgate assembly 22 to allow two-tier loading of cargo similar to tailgate assembly 22 shown in FIGS. 5 and 8. The third panel portion 160 can function as a terminal end wall with the first panel portion 124 in the open position, the second panel portion 130 in the first position and the third panel portion 160 in the use position similar to third panel portion 60 of FIG. 8. The first panel portion 124 may be placed in the closed position, the second panel portion in the second position, and the third panel portion 160 in the stowed position to accommodate a fifth-wheeler, similar to the arrangement of the tailgate assembly 22 in FIG. 10.

While the best modes for carrying out the invention have been described in detail, those familiar with the art to which this invention relates will recognize various alternative designs and embodiments for practicing the invention within the scope of the appended claims.

The invention claimed is:

1. A tailgate assembly for connection to a vehicle body comprising:

a first panel portion configured for hinged connection to the vehicle body and pivotable between a closed position and an open position with respect to the vehicle body;

a second panel portion hinged to the first panel portion and configured to be pivoted between a first position and a second position; wherein the second panel portion is generally parallel with the first panel portion when the first panel portion is in the closed position and the second panel portion is in the first position with both the first panel portion and the second panel portion extending upward on the vehicle body and the second panel portion extending above the first panel portion; wherein the second panel portion is generally perpendicular to the first panel portion in the second position;

a third panel portion hinged to the second panel portion and configured to be pivoted between a stowed position and a use position; wherein the third panel portion extends generally parallel with the second panel portion when the third panel portion is in the stowed position; wherein the third panel portion extends generally perpendicular to the second panel portion in the use position; wherein the tailgate assembly extends upward on the vehicle body no further than the second panel portion when the first panel portion is in the closed position, the second panel portion is in the first position and the third panel portion is in either of the stowed position and the use position.

2. The tailgate assembly of claim 1, further comprising:
a latch configured to maintain the second panel portion in the first position; and
a release lever operatively connected to the latch and configured to release the latch to permit the second panel portion to be pivoted to the second position.

3. The tailgate assembly of claim 1, in combination with the vehicle body, wherein the first panel portion is hinged to the vehicle; wherein the tailgate assembly and the vehicle body define a cargo space with the tailgate assembly partially enclosing the cargo space when the first panel portion is in the closed position; and wherein the tailgate assembly provides access to and extends the cargo space when the first panel portion is in the open position.

4. The tailgate assembly and vehicle body of claim 3, wherein the vehicle body includes a floor; wherein the second panel portion is generally parallel with the floor when the first panel portion is in the closed position and the second panel portion is in the second position, the floor defining a first loading surface and the second panel portion defining a second loading surface spaced from the first loading surface and extending outward from the vehicle body.

5. The tailgate assembly and vehicle body of claim 4, wherein the first panel portion extends generally parallel to and generally flush with the floor when the first panel portion is in the open position to extend the first loading surface.

6. The tailgate assembly and vehicle body of claim 4, wherein the third panel portion is in the use position and extends outward from the second panel portion to function as a step for accessing the cargo space when the first panel portion is in the open position and the second panel portion is in the second position.

7. The tailgate assembly and vehicle body of claim 4, wherein the first panel portion extends generally parallel to and generally flush with the floor in the open position to extend the first loading surface and the third panel portion functions as a terminal end wall when the first panel portion is in the open position, the second panel portion is in the first position, and the third panel portion is in the use position.

8. The tailgate assembly and vehicle body of claim 4, wherein the third panel portion extends generally parallel to the floor and directly above the floor with the first panel portion in the closed position, the second panel portion in the first position, and the third panel portion in the use position.

9. The tailgate assembly of claim 1, wherein the first panel portion forms a recess and the second panel portion is hinged to the first panel portion in the recess.

10. The tailgate assembly of claim 9, wherein the recess is generally U-shaped.

11. A tailgate assembly for connection to a vehicle body comprising:
a first panel portion configured for hinged connection to the vehicle body and pivotable between a closed position and an open position with respect to the vehicle body;
a second panel portion hinged to the first panel portion and pivotable from a first position to a second position; wherein the second panel portion is generally parallel with the first panel portion when the first panel portion is in the closed position and the second panel portion is in the first position with both the first panel portion and the second panel portion extending upward on the vehicle body and the second panel portion extending above the first panel portion; wherein the second panel portion is generally perpendicular to the first panel portion in the second position;
a latch configured to maintain the second panel portion in the first position;
a release lever operatively connected to the latch and configured to release the latch to permit the second panel portion to be pivoted to the second position; and
a third panel portion hinged to the second panel portion and pivotable between a stowed position in which the third panel portion extends generally parallel with the second panel portion and a use position in which the third panel portion extends generally perpendicular with the second panel portion.

12. The tailgate assembly of claim 11, wherein the first panel portion forms a recess and the second panel portion is hinged to the first panel portion in the recess.

13. The tailgate assembly of claim 12, wherein the recess is generally U-shaped.

14. A vehicle comprising:
vehicle sidewalls;
a floor;
a tailgate assembly that includes:
a first panel portion hinged to the floor to at least partially define a cargo space with the vehicle sidewalls and the floor;
a second panel portion hinged to the first panel portion and pivotable in a first direction of rotation from a first position in which the second panel portion is generally parallel with the first panel portion to a second position in which the second panel portion is generally perpendicular to the first panel portion;
a third panel portion hinged to the second panel portion and pivotable between a stowed position in which the third panel portion extends generally parallel with the second panel portion and a use position in which the third panel portion extends generally perpendicular to the second panel portion;
wherein the tailgate assembly is substantially a first height when the second panel portion is in the first position and the third panel portion is in either of the stowed position and the use position;
wherein the third panel portion defines a terminal end of the cargo space when the first panel portion is in the open position, the second panel portion is in the first position, and the third panel portion is in the use position; and
wherein the third panel portion is configured as a step when the first panel portion is in the open position, the second panel portion is in the second position and the third panel portion is in the use position.

15. The tailgate assembly of claim 14, wherein the first panel portion forms a recess and the second panel portion is hinged to the first panel portion in the recess.

16. The tailgate assembly of claim 15, wherein the recess is generally U-shaped.

17. The tailgate assembly of claim 9, wherein the first panel portion forms two posts at lateral ends of the second panel portion on either side of the recess.

18. The tailgate assembly of claim 12, wherein the first panel portion forms two posts at lateral ends of the second panel portion on either side of the recess.

19. The tailgate assembly of claim 14, further comprising:
a latch configured to maintain the second panel portion in the first position; and
a release lever operatively connected to the latch and configured to release the latch to permit the second panel portion to be pivoted to the second position.

* * * * *